United States Patent
Marlow (10) Patent No.: US 11,797,332 B2
(45) Date of Patent: Oct. 24, 2023

(54) SYSTEM FOR TRANSFORMING LEGACY ITEMS CONTAINED IN A DATA ARCHIVE FOR EXECUTION OR USE BY AN EXECUTABLE

(71) Applicant: Red Hat, Inc., Raleigh, NC (US)

(72) Inventor: Scott Marlow, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 544 days.

(21) Appl. No.: 16/694,009

(22) Filed: Nov. 25, 2019

(65) Prior Publication Data

US 2021/0157633 A1    May 27, 2021

(51) Int. Cl.
  *G06F 9/46* (2006.01)
  *G06F 9/48* (2006.01)
  *G06F 9/455* (2018.01)

(52) U.S. Cl.
  CPC ........ *G06F 9/4806* (2013.01); *G06F 9/45516* (2013.01)

(58) Field of Classification Search
  None
  See application file for complete search history.

(56) References Cited

U.S. PATENT DOCUMENTS

| | | | |
|---|---|---|---|
| 8,554,738 B2 * | 10/2013 | Marshall | G06F 16/116 707/661 |
| 8,793,674 B2 | 7/2014 | Ravi et al. | |
| 9,081,896 B1 * | 7/2015 | Efremov | G06F 9/45508 |
| 9,141,415 B2 | 9/2015 | Rasmussen et al. | |
| 9,183,021 B2 | 11/2015 | Dinn | |
| 9,626,268 B2 | 4/2017 | Blake et al. | |
| 9,841,953 B2 * | 12/2017 | Laskey | G06F 8/41 |

FOREIGN PATENT DOCUMENTS

| | | |
|---|---|---|
| WO | 2015171117 | 11/2015 |
| WO | 2016092174 | 6/2016 |

OTHER PUBLICATIONS

Automating Program Transformation for Java Using Semantic Patches; Kang et al.; al.inria.fr/hal-02023368/; retrieved Sep. 6, 2019; pp. 1-2.
Class file and Jar/War file Transformer usuable for Jakarta EE packaging renaming; thub.com/bjhargrave/transformer; retrieved Nov. 25, 2019 (3 pages).

(Continued)

*Primary Examiner* — Bing Zhao
(74) *Attorney, Agent, or Firm* — K&L Gates LLP (57) ABSTRACT

Methods and systems for transforming data archives are provided. In one embodiment, a method is provided that includes receiving a data archive and selecting a first data item from among a plurality of data items contained within the data archive. A first data format of the first data item may be identified that specifies a first type of data stored in the first data item and a first data transformation may be selected that corresponds to the first data format. The first type of data may be transformed by the first data transformation to generate a first transformed data item. The first data item may be replaced with the first transformed data item in the data archive and an executable item contained within the data archive may be executed.

20 Claims, 6 Drawing Sheets

(56) References Cited

OTHER PUBLICATIONS

Jakartaee-platform / namespace / other-javax-references.adoc; thub.com/eclipse-ee4j/jakartaee-platform/blob/master/namespace/other-javax-ref . . . ; retrieved Nov. 25, 2019 (8 pages).
Jakartaee-platform / namespace / compatibility-prototypes.adocl; thub.com/eclipse-ee4j/jakartaee-platform/blob/master/namespace/compatibility- . . . ; retrieved Nov. 25, 2019 (2 pages).
Jakartaee-platform / namespace / backwards-compatibilty.adoc, thub.com/eclipse-ee4j/jakartaee-platform/blob/master/namespace/backwards-co.; retrieved Nov. 25, 2019 (2 pages).

* cited by examiner

SYSTEM FOR TRANSFORMING LEGACY ITEMS CONTAINED IN A DATA ARCHIVE FOR EXECUTION OR USE BY AN EXECUTABLE

BACKGROUND

When developing software, applications may require different types of files for execution. For example, an application may include one or more files containing code (e.g., source code, bytecode) that indicates the actions taken when executing the application. An application may also include other types of files, such as files containing configurations, data, images, or other information necessary to properly execute the application. In such instances, applications may be stored as archives containing the various files required for proper execution of the application.

SUMMARY

The present disclosure presents new and innovative systems and methods for transforming data archives. In one embodiment, a method is provided that includes receiving a data archive containing a plurality of data items and selecting a first data item of the plurality of data items. A first data format of the first data item may then be identified. The first data format may specify a first type of data stored in the first data item. The method may then include selecting, from among a plurality of data transformations, a first data transformation corresponding to the first data format and transforming, by the first data transformation, the first type of data stored in the first data item to generate a first transformed data item. The first data item may then be replaced in the data archive with the first transformed data item and an executable item of the plurality of data items may be executed.

In another embodiment, a system is provided that includes a processor and a memory. The memory may store instructions which, when executed by the processor, cause the processor to receive a data archive containing a plurality of data items and select a first data item of the plurality of data items. The memory may store further instructions which, when executed by the processor, cause the processor to identify a first data format of the first data item. The first data format may specify a first type of data stored in the first data item. The memory may store still further instructions which, when executed by the processor, cause the processor to select, from among a plurality of data transformations, a first data transformation corresponding to the first data format and transform, by the first data transformation, the first type of data stored in the first data item to generate a first transformed data item. The memory may also store instructions which, when executed by the processor, cause the processor to replace the first data item in the data archive with the first transformed data item and execute an executable item of the plurality of data items.

In a further embodiment, a non-transitory, computer-readable medium is provided storing instructions which, when executed by a processor, cause the processor to receive a data archive containing a plurality of data items and select a first data item of the plurality of data items. The non-transitory, computer-readable medium may store further instructions which, when executed by the processor, cause the processor to identify a first data format of the first data item. The first data format may specify a first type of data stored in the first data item. The non-transitory, computer-readable medium may store still further instructions which, when executed by the processor, cause the processor to select, from among a plurality of data transformations, a first data transformation corresponding to the first data format and transform, by the first data transformation, the first type of data stored in the first data item to generate a first transformed data item. The non-transitory, computer-readable medium may also store instructions which, when executed by a processor, cause the processor to replace the first data item in the data archive with the first transformed data item and execute an executable item of the plurality of data items.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the disclosed subject matter.

DETAILED DESCRIPTION OF EXAMPLE EMBODIMENTS

In certain implementations, archives containing applications may need to be transformed or otherwise altered to properly execute. Transforming the archive may alter one or more of the files contained within the archive. The transformation may be performed, e.g., to configure an application for execution within a particular computing environment. For example, an application may be initially prepared and configured to execute within a particular operating system or version of an operating system (e.g., a Red Hat® Enterprise Linux® operating system). To execute properly within a different operating system, one or more of the files within the archive may need to be modified. For example, one or more configuration files may need to be updated to properly configure the application for the different operating system. As another example, an application may be prepared to execute within a particular runtime environment (e.g., the Java® EE 8 runtime environment). However, executing in a different runtime environment (e.g., the Eclipse® Jakarta EE® 9 runtime environment) may require certain aspects of the application to be changed to comply with an execution requirement. In particular, the Eclipse® Jakarta EE® 9 may utilize similar types of classes and functions as the Java® EE 8 specification, but may utilize a different namespace and/or organizational taxonomy for classes. Therefore, it may be necessary to update, e.g., resources (e.g., bytecode resources) and class definition files contained within the archive file containing an application initially configured within the Java® EE 8 runtime environment for proper execution within the Eclipse® Jakarta EE® 9 runtime environment.

Typically, to perform such transformations, transformation tools such as ASM, Javassist, and Byte Buddy may be used to create individualized transformations identifying types of transformations that may be performed on particular types of data. For example, a transformation may be created to transform bytecode configured for execution in one operating system into bytecode that can be executed in a different operating system. As another example, a separate transformation strategy may be created to transform a class file configured for execution in the Java® EE 8 runtime environment into a class file that can be executed in the Eclipse® Jakarta EE® 9 runtime environment. However, such systems require that the particular transformation used for each archive be specifically identified. Furthermore, such systems are typically not interoperable, so transformations performed by one transformation tool typically cannot be triggered or controlled by another transformation tool.

Accordingly, there exists a need for a system capable of receiving and controlling transformations from multiple transformation tools. Furthermore, such a system should be capable of identifying an appropriate, corresponding transformation to apply to individual data archives without having the corresponding transformation manually identified. One solution to this problem is to provide a computing device that interfaces with multiple transformation systems. Each of the transformation systems may have their own associated transformations, which may specify particular actions to take when transformation archives. The computing device may receive information regarding the transformations available with each transformation system and may store a transformation scheme that combines one or more data transformations. In certain implementations, the transformation scheme may be associated with particular archives (e.g., archives containing particular types of applications, archives originating from particular sources, and/or archives intended for execution within particular runtime environments). The computing device may then interface with and control the transformation systems such that proper transformations are applied to particular types of data within data archives that are received for transformation.

Figure 1:
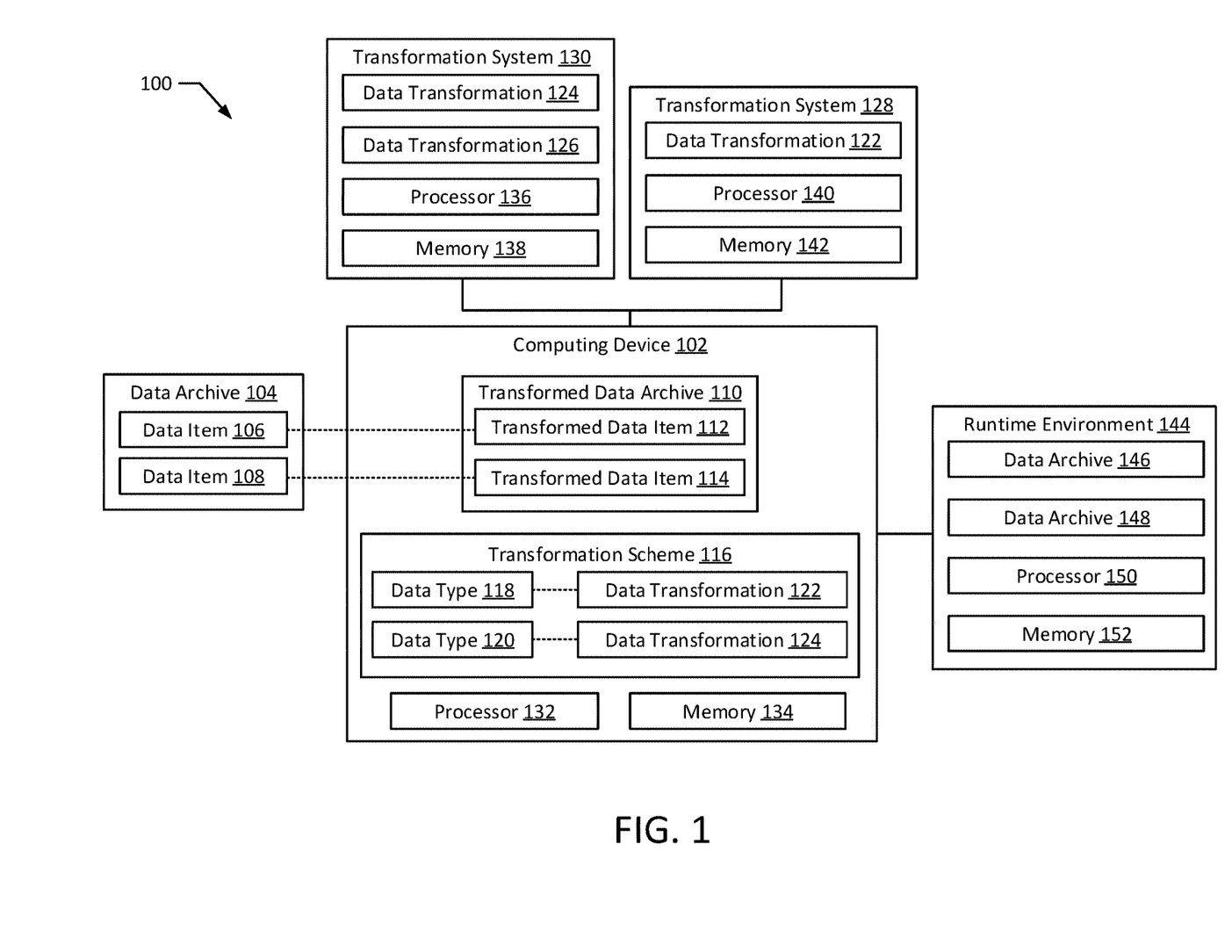
FIG. 1 illustrates a system according to an exemplary embodiment of the present disclosure.

FIG. 1 illustrates a system 100 according to an exemplary embodiment of the present disclosure. The system 100 may be configured to receive data archives to identify and apply transformations to data within the data archives. The system 100 includes a computing device 102, a data archive 104, a runtime environment 144, and transformation system 128, 130.

The computing device 102 may be configured to receive data archives 104 and to transform the data archives 104 into transformed data archives 110 using one or more of the transformation systems 128, 130. For example, the computing device 102 may receive the data archive 104 for transformation before execution in the runtime environment 144. As depicted, the runtime environment 144 stores data archives 146, 148 for execution. In certain implementations, the runtime environment 144 may correspond to, e.g., a Java® EE 8 environment and/or an Eclipse Jakarta EE® 9 environment. In such instances, the data archive 104 may be configured to execute in a different runtime environment and the computing device 102 may transform the data archive 104 into a transformed data archive 110 that can be executed within the runtime environment 144. In additional or alternative implementations, the computing device 102 may transform the data archive 104 into a transformed data archive 110 capable of executing in a different operating system, or to transform the data archive 104 into a transformed data archive 110 that includes an updated version of a different application or function (e.g., a dependency of the application).

Accordingly, the transformed data archive 110 includes transformed data items 112, 114, which each correspond to a data item 106, 108 of the data archive. The data items 106, 108 may correspond to different types of data, such as resources, source code, bytecode, extended markup language (XML) files, class definition files, configuration files, and the like. In certain implementations, each of the data items 106, 108 may be transformed to generate corresponding transformed data items 112, 114 included within the transformed data archive 110. In additional or alternative implementations, one or more of the data items 106, 108 may not be transformed. For example, in certain implementations, the data item 108 may not be transformed and the transformed data archive 110 may instead include the transformed data item 112 and the data item 108.

The computing device 102 may transform the data archive 104 according to a transformation scheme 116. The transformation scheme includes data types 118, 120 and associated data transformations 122, 124. As explained further below, the data transformations 122, 124 may specify particular types of transformation elements to perform to alter data of the associated data type 118, 120. Upon receiving the data archive 104, the computing device 102 may identify an associated data type 118, 120 for one or more of the data items 106, 108 included within the data archive 104. The computing device 102 may then identify one or more data transformations 122, 124 associated with the data types 118, 120 that are identified and may process each data item 106, 108 corresponding to each data type's 118, 120 corresponding data transformation 122, 124.

The transformation systems 128, 130 may be configured to create the data transformations 124, 126, 128. For example, each transformation system 128, 130 may be utilized to create (e.g., automatically create and/or create at the request of a technician) data transformations 124, 126, 128 that perform particular transformation elements on corresponding types of data. For example, each of the data transformations 124, 126, 128 may be generated to transform one or more particular types of data and may specify transformation elements directed to transforming the specific type of corresponding data. In certain implementations, the transformation systems 128, 130 may execute the data transformations 124, 126, 128 as well. For example, the transformation systems 128, 130 may receive data archives 104 and/or data items 106, 108 from the computing device 102 and may transform all or part of the received data archives 104 and/or data items 106, 108 according to one or more of the data transformations 124, 126, 128 contained by the transformation systems 128, 130. The transformation systems 128, 130 may be exemplary implementations of the above discussed transformation tools. For example, the transformation systems 128 may be implemented by one or more of ASM, Byte Buddy and Javassist transformation systems. The transformation systems 128, 130 include processors 136, 140 and memories 138, 142, which may be configured to implement all or part of the functions of the transformation systems 128, 130. In certain implementations, for example, the transformation systems 128, 130 may be implemented as separate computing system from the computing device 102. In additional or alternative implementations, the transformation systems 128, 130 may be implemented by the same computing system(s) as the computing device 102. For example, the computing device 102 and the transformation systems 128, 130 may be implemented as a single computing system (e.g., a single physical or virtual computing device) and/or as multiple computing systems (e.g., multiple physical or virtual computing devices).

The processors 132, 136, 140, 150 and memories 134, 138, 142, 152 may implement one or more aspects of the computing device 102, the transformation systems 128, 130, and/or the runtime environment 144. For example, the memories 134, 138, 142, 152 may store instructions which, when executed by the processors 132, 136, 140, 150, may cause the processors 132, 136, 140, 150 to perform one or more operational features of the computing device 102, the transformation systems 128, 130, and/or the runtime environment 144.

Figure 2:
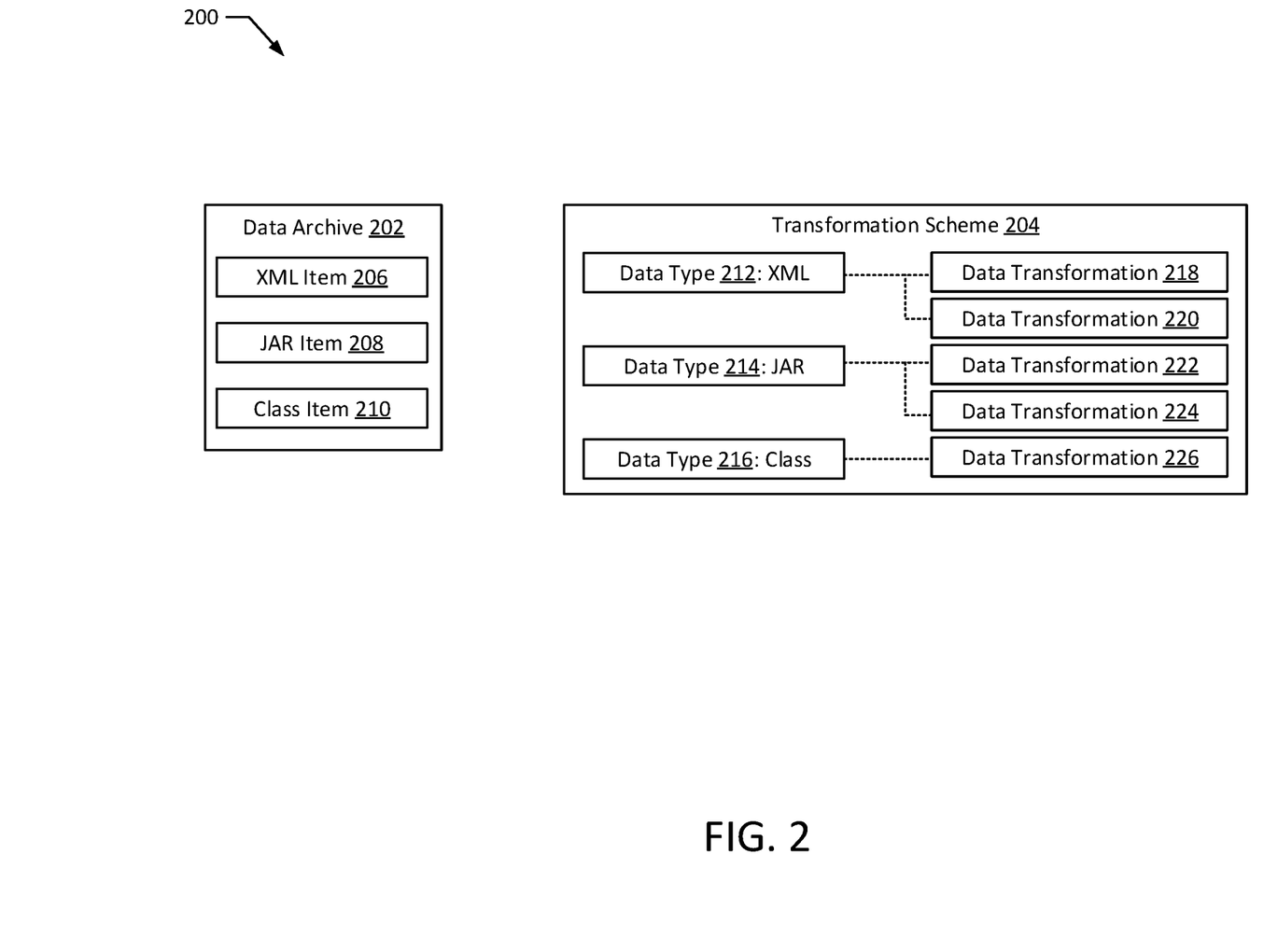
FIG. 2 illustrates a transformation scheme scenario according to an exemplary embodiment of the present disclosure.

FIG. 2 illustrates a transformation scheme scenario 200 according to an exemplary embodiment of the present disclosure. The transportation scheme scenario 200 includes a data archive 202 and a transformation scheme 204. The data archive 202 includes data items of different types. For example, the data archive 202 includes an XML item 206, a Java® archive (JAR) item 208, and a class item 210. In certain implementations, the data archive 202 may store an application (e.g., a Java® application) for execution. For example, the XML item 206 may include an XML file storing data and/or configurations options for use in executing the application contained by the data archive 202. The JAR item 208 may include a JAR file storing code (e.g., bytecode) that defines the actions taken during execution of the application and/or other types of data for use in executing the application. The class item 210 may include a class file that specifies the classes (e.g., Java® classes) used during execution of the code, such as the classes called by the code contained within the JAR item 208. In certain implementations, the data archive 202 may be implemented as an enterprise application archive (EAR) file containing the items 206, 208, 210.

The transformation scheme 204 stores associations between data types 212, 214, 216 and data transformations 218, 220, 222, 224, 226. The data transformations 218, 220, 222, 224, 226 may include data transformations from different transformation systems 128, 130. For example, the data transformations 218, 222 may be from a first transformation system, the data transformations 220, 226 may be from a second transformation system, and the data transformation system 224 may be from a third transformation system. The data types 212, 214, 216 may identify particular types of data items. For example, the data type 212 identifies XML data items, the data type 214 identifies JAR data items, and the data type 216 identifies class data items.

Each of the data types 212, 214, 216 includes at least one data transformation 218, 220, 222, 224, 226. In particular the data type 212 corresponds to data transformations 218, 220, the data type 214 corresponds to data transformations 222, 224, and they data type 216 corresponds to the data transformation 226. When transforming the data archive 202 according to the transformation scheme 204, the computing device 102 may identify data items of the type specified by the data types 212, 214, 216 and may perform the corresponding data transformations 218, 220, 222, 224, 226 on the data items. For example, as specified by the transformation scheme 204, the computing device 102 may perform the data transformations 218, 220 on the XML item 206 (e.g., may perform the data transformations 218, 220 using eXtensible Stylesheet Language Transformations (XSLT) system), may perform the data transformations 222, 224 on the JAR item 208, and may perform the data transformation 226 on the class item 210.

In instances where the transformation scheme 204 includes more than one data transformation 218, 220, 222, 224, 226 for a particular data type 212, 214, 216, the data transformations 218, 220, 222, 224, 226 may be performed in a particular order. For example, when transforming XML items 206, the transformation scheme 204 may specify that the data transformation 218 is performed before the data transformation 220. As another example, when processing JAR items 208, the transformation scheme 204 may specify that the data transformation 222 is performed before the data transformation 224. Similarly, in certain implementations all or part of the data types 212, 214, 216 may be processed in a particular order. For example, the transformation scheme 226 may specify that XML items 206 are transformed before JAR items 208, which are transformed before class items 210. In implementations where the data archive 202 includes more than one of a particular type of data item, the data items of the same type may be processed sequentially and/or in parallel. For example, if the data archive 202 includes multiple XML items 206, the computing device 102 may process each XML item 206 sequentially according to the data transformations 218, 220. In certain implementations, each XML item 206 may be transformed according to data transformation 218 before any of the XML items 206 are transformed according to data transformation 220. As another example, the computing device 102 may transform the multiple XML items 206 in parallel according to both the data transformations 218, 220. In certain implementations, the multiple data items may be processed partially in sequence and partially in parallel. For example, the computing device 102 may transform multiple XML items 206 sequentially according to the data transformation 218 before processing the multiple XML items 206 in parallel according to the data transformation 220.

In certain implementations, the transformation scheme 204 may not specify data transformations 218, 220, 222, 224, 226 for all types of data included within a data archive 202. For example, the data archive 202 may additionally include images or other data files that do not need to be transformed. In such instances, data items for which no corresponding data transformation 218, 220, 222, 224, 226 is included within the transformation scheme 204 may be included in a corresponding transformed data archive 110 without being transformed.

Figure 3:
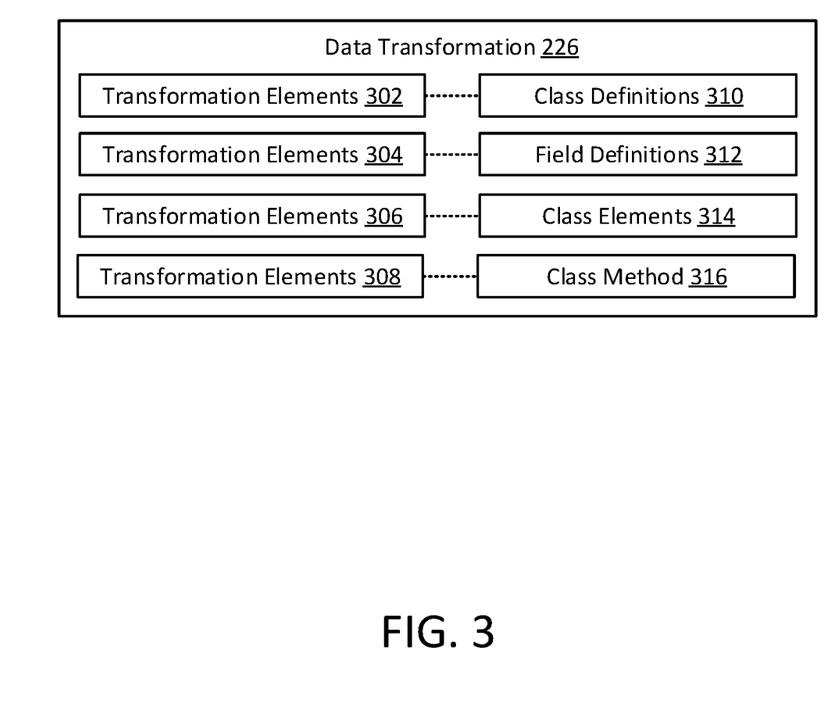
FIG. 3 illustrates a data transformation according to an exemplary embodiment of the present disclosure.

FIG. 3 illustrates a data transformation 226 according to an exemplary embodiment of the present disclosure. The data transformation 226 as depicted may represent an exemplary implementation of the data transformation 226 of the data transformation 204. The data transformation 226 includes multiple transformation elements 302, 304, 306, 308. The transformation elements 302, 304, 306, 308 may each correspond to a different type of transformation element. For example, and as depicted in FIG. 2, the data transformation 226 is performed to transform class items 210. Accordingly, the transformation elements 302, 304, 306, 308 may correspond to various types of actions that can be taken to change or update class items 210.

For example, the transformation elements 302 may be performed to update the class definitions 310 of a class item 210. The class definitions 310 may define, e.g., the name and/or inheritances of classes included within the class item 210. The transformation elements may therefore specify one or more changes to the class definitions 310 (e.g., the names and/or inheritances) of the classes within the class item 210.

For example, the transformation elements 302 may be performed to update the class names from one runtime environment (e.g., the Java® EE 8 runtime environment) to the class names of another runtime environment (e.g., the Jakarta EE® 9 runtime environment).

The transformation elements 304 may be performed to update the field definitions 312 of a class item 210. For example, the field definitions 312 may define the fields and/or variables utilized by the classes (e.g., the classes defined in the class definitions 310). The transformation elements 304 may update the field definitions by adding, removing, and/or altering (e.g., changing the name or contents of) one or more of the fields in the class item 210.

The transformation elements 306 may be performed to update the class elements 314 of a class item 210. For example, the class elements 314 may represent elements (e.g., objects and/or constructs) of the class item and/or the application represented by the data archive 202. The transformation elements 306 may update the class elements 314 by adding, removing, replacing or altering the class elements 314.

The transformation elements 308 may be performed to update a class method 316 of a class item 210. For example, the class method 316 may include code (e.g., source code and/or byte code implementing a function of a class (e.g., a class defined in the class definitions 310). Performing the transformation elements 308 may alter or otherwise update the class method 316 by, e.g., altering and/or updating the code included within the class method 316. For example, where the data transformation 226 is performed to transform the class item 210 for execution in a runtime environment 144, the transformation elements 308 may be performed to update calls to functions, libraries, and/or other classes of a different runtime environment to refer to the functions, libraries, and/or other classes of the runtime environment 144. In certain implementations, the class item 210 may include multiple class methods 316. The data transformation 226 may include transformation elements 308 configured to update one or more of the multiple class methods 316 (e.g., at least a subset of the class methods 316). In certain implementations, one or more of the class methods 316 that are updated may have separate corresponding transformation elements different from the transformation elements 308. In additional or alternative implementations, the transformation elements may be established to update and/or transform each class method 316 that needs to be updated.

In certain implementations, the transformation elements 302, 304, 306, 308 may be performed in a predetermined order and/or according to a predetermined priority. For example, a predetermined order associated with the data transformation 226 may indicate that the transformation elements 302 are performed first, followed by the transformation elements 304, which are followed by the transformation elements 306, and that the transformation elements 308 are performed last.

In the above examples, the data transformation 226 is depicted and discussed as corresponding to a transformation of a class item 210. However, it should be understood that implementations similar to those depicted in FIG. 3 and discussed above may be utilized to implement any of the other data transformations 122, 124, 126, 218, 220, 222, 224 discussed herein. For example, the data transformations 122, 124, 126, 218, 220, 222, 224 may similarly include one or more transformation elements that are directed to transforming portions of other types of data items. For example, the data transformation 218 may include transformation elements that specify actions taken to update data stored in an XML item 208 (e.g., names, configurations) and the data transformation 222 may include transformation elements that specify actions taken to update code stored in a JAR item 208 (e.g., function, class, or library calls within the code).

Figure 4:
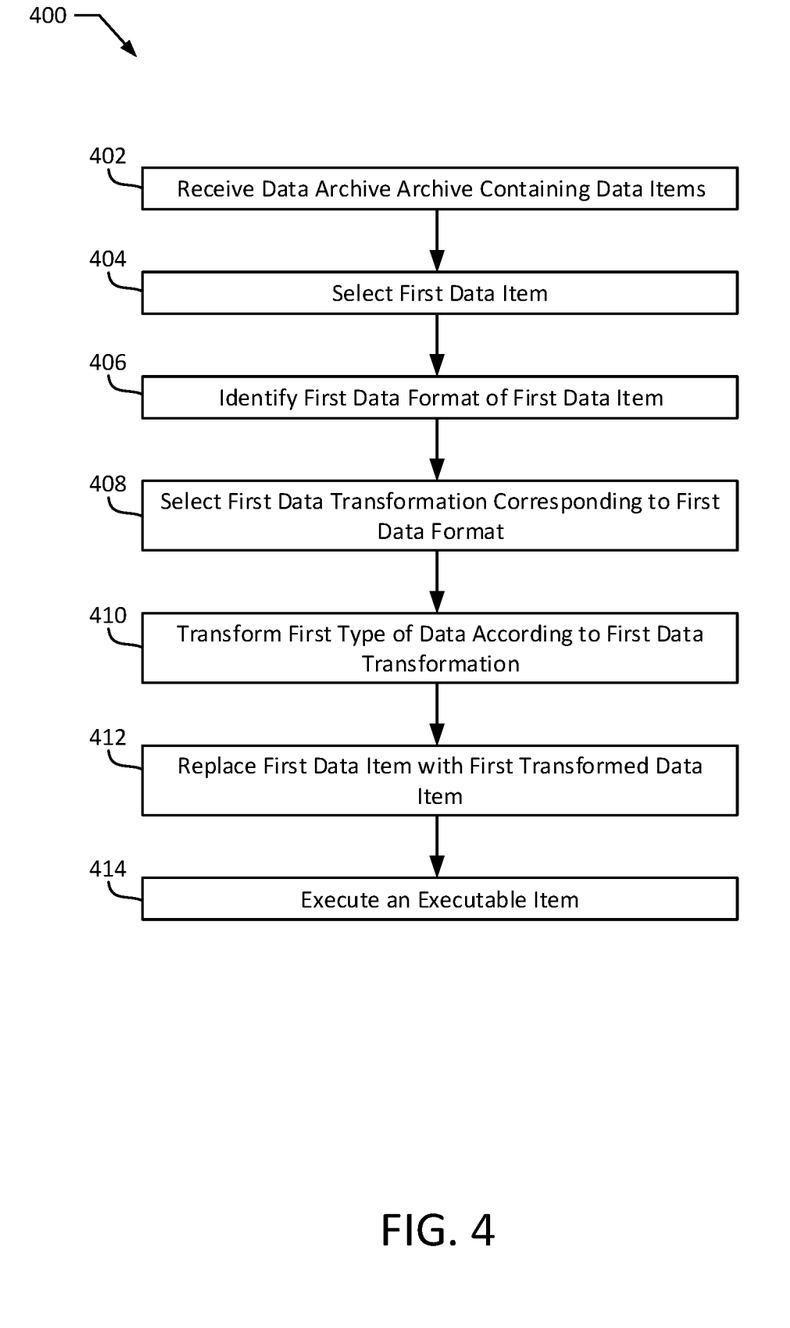
FIG. 4 illustrates a method according to an exemplary embodiment of the present disclosure.

FIG. 4 illustrates a method 400 according to an exemplary embodiment of the present disclosure. The method 400 may be performed to receive and transform data archives according to transformation schemes. For example, the method 400 may be performed by the computing device 102 to receive and transform data archive 104, 202 according to transformation schemes 116, 204. The method 400 may be implemented by a set of instructions stored on a computer readable medium that, when executed by a processor, cause the computer system to perform the method 400. For example, all or part of the method 400 may be implemented by the one or more of the processors 132, 136, 140, 150 and the memories 134, 138, 142, 152. Although the examples below are described with reference to the flowchart illustrated in FIG. 4, many other methods of performing the acts associated with FIG. 4 may be used. For example, the order of some of the blocks may be changed, certain blocks may be combined with other blocks, one or more of the blocks may be repeated, and some of the blocks described may be optional.

The method 400 may begin with receiving a data archive containing data items (block 402). For example, the computing device 102 may receive a data archive 104, 202. The data archive 104, 202 may include data items, such as the data items 106, 108. The data items 106, 108 may have corresponding types. For example, the data archive 104, 202 may include one or more of an XML item 206, a JAR item 208, and a class item 210. The data archive 104, 202 may include additional or alternative types of data items. For example, the data items may include image files, video files, audio files, binary files, text files, and the like. The data archive 104, 202 may be received from another computing device, such as another computing device connected to the computing device 102 via a network. In certain implementations, the data archive 104, 202 may be received from a software process executing on the computing device 102.

A first data item may be selected (block 404). For example, the computing device 102 may select a first data item 106, 108 from the received data archive 104, 202. A first data format of the first data item may then be identified (block 406). For example, the computing device 102 may identify a first data format of the identified first data item 106, 108. The first data format may specify a data type 118, 120 of data stored within the first data item. For example, the first data format may be identified as a file type of the first data item. In certain implementations, blocks 404 and 406 may be performed together. For instance, the first data item 106, 108 may be selected according to a priority or ordering indicated by a transformation scheme 116, 204. As an example, the computing device 102 may be configured to transform the data archive 104, 202 according to a transformation scheme 116, 204. In particular, upon receiving the data archive 104, 202, the computing device 102 may identify a corresponding transformation scheme 116, 204. The computing device 102 may therefore identify the first data item 106, 108 based on an ordering indicated by the identified transformation scheme 116, 204. For example, the ordering may indicate that a particular type of data item 106, 108 should be identified first (e.g., an XML item 206, a JAR item 208, and/or a class item 210) and the computing device 102 may identify the corresponding type of data item 106, 108 within the received data archive 104, 202. Thus, the first data type 118, 120 may be identified at the same time as or prior to the computing device 102 selecting the first data item 106, 108.

A first data transformation may then be selected that corresponds to the first data format (block 408). For example, the computing device 102 may select a first data transformation 122, 124 that corresponds to a first data type 118, 120 of the first data format. In particular, and as explained above, the computing device 102 may be transform the data archive 104, 202 according to a transportation scheme 116, 204. The transportation scheme 116, 204 may store associations between data types 118, 120, 212, 214, 216 and data transformations 122, 124, 218, 220, 222, 224, 226. To identify the first data transformation, the computing device 102 may identify one or more data transformations 122, 124, 218, 220, 222, 224, 226 associated with the first data type 118, 120 in the transformation scheme 116, 204. For example, if the first data type is an XML item and the computing device 102 is transforming the received data archive 202 according to the transformation scheme 204, the computing device may identify the data transformations 218, 220. In such implementations, where more than one data transformation 218, 220 corresponds to the same data type 212, the computing device 102 may identify, as the first data transformation 218, 220, the data transformation 218, 220 that comes first according to a priority or ordering associated with the transformation scheme 116, 204. For example, the computing device 102 may determine that the data transformation 218 comes before the data transformation 220 in an ordering associated with the transformation scheme 204 and may therefore identify the data transformation 218 as the first data transformation.

The first type of data may then be transformed according to the first data transformation (block 410). For example, the computing device 102 may transform the first type of data contained within the first data item 106, 108 according to the first data transformation 122, 124 to generate a transformed data item 112, 114. As explained above, data transformations 122, 124 may include multiple transformation elements 302, 304, 306, 308 that specify actions for transformation particular portions of a data item. In such implementations, the computing device 102 may transform the first data item 106, 108 by performing the actions specified by the transformation elements 302, 304, 306, 308. In still further implementations, the computing device 102 may transform the first data item 106, 108 via a transformation system 128, 130. For example, the computing device 102 may transmit the first data item 106, 108 and/or the data archive 104, 202 to a transformation system 128, 130 corresponding to the first data transformation 122, 124 (e.g., to the transformation system 128, 130 used to create the data transformation 122, 124). The transformation system 128, 130 may then perform the transformation elements 302, 304, 306, 308 specified by the first data transformation 122, 124. In certain implementations, as described above, more than one data transformation 122, 124 may correspond to the first data item 106, 108. In such instances, blocks 408, 410 may be repeated for each of the data transformations 122, 124. For example, blocks 408, 410 may be repeated to perform each of the identified data transformations 122, 124 on the first data item 106, 108 according to the order and/or priority.

The first data item may then be replaced with the first transformed data item (block 412). For example, the computing device 102 may replace the first data item 106, 108 with the transformed data item 112, 114. In certain implementations, when creating the transformed data archive 110 based on the transformation of the data archive 104, the computing device 102 may, upon completing the first data transformation, remove the first data item 106, 108 from the data archive 104 and add the transformed data item 112, 114 to generate the transformed data archive 110. An executable item may then be executed (block 414). For example, the computing device 102 may execute an executable item from the transformed data archive 110. For example, the computing device 102 may identify a transformed data item 112, 114 that corresponds to an executable data item (e.g., a JAR item 208) within the data archive 104 and may execute the corresponding transformed data item 112, 114.

In certain implementations, all or part of the method 400 may be repeated. For example, the computing device 102 may receive multiple data archives 104, 202 and may repeat the method 400 for each of the received data archives 104, 202 to transform the multiple data archives 104, 202 into multiple transformed data archives 110. As another example, portions of the method 400 may be repeated to transform additional data items 106, 108 contained within the data archive 104, 202. For example, blocks 404, 406, 408, 410, 412 may be repeated to select and transform multiple data items within a data archive. For example, blocks 404, 406, 408, 410, 412 may be repeated to transform each type of data item 106, 108 within a data archive 104, 202 for which a corresponding transformation scheme includes one or more data transformations 122, 124, 218, 220, 222, 224, 226.

Figure 5:
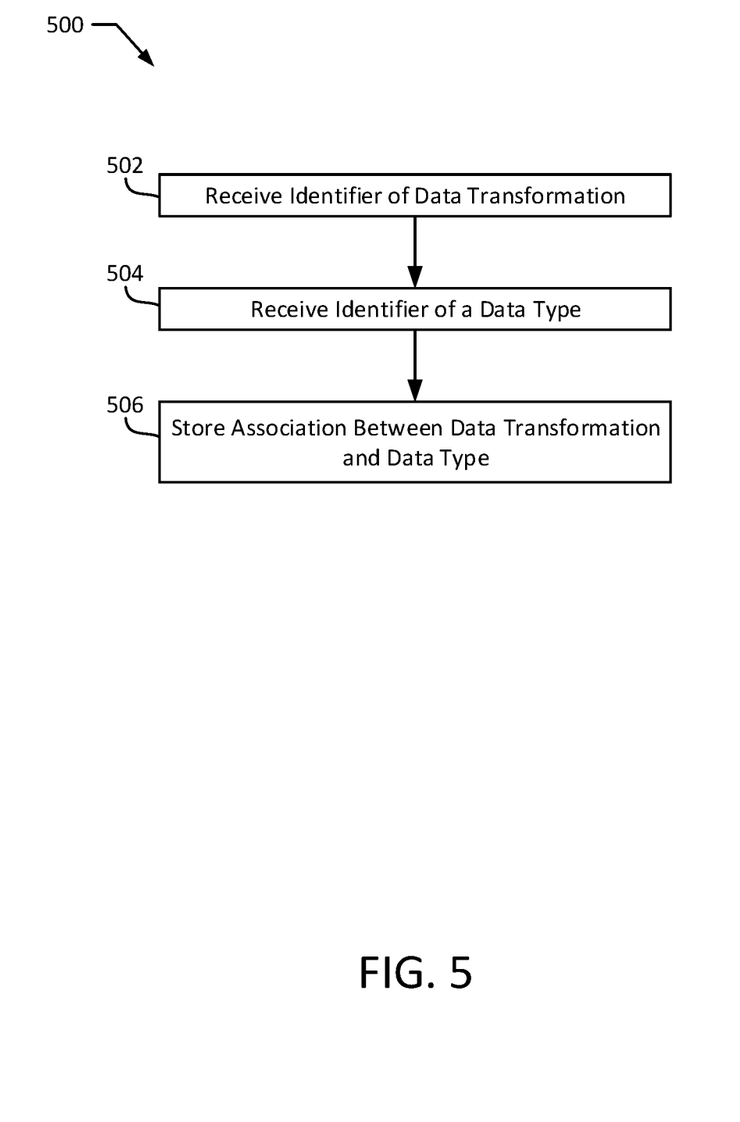
FIG. 5 illustrates a method according to an exemplary embodiment of the present disclosure.

FIG. 5 illustrates a method 500 according to an exemplary embodiment of the present disclosure. The method 500 may be performed to create a transformation scheme 116, 204. For example, the method 500 may be performed by the computing device 102 to create a transformation scheme 116, 204 for use in transforming received data archives 104, 202. The method 500 may be implemented by a set of instructions stored on a computer readable medium that, when executed by a processor, cause the computer system to perform the method 500. For example, all or part of the method 400 may be implemented by the one or more of the processors 132, 136, 140, 150 and the memories 134, 138, 142, 152. Although the examples below are described with reference to the flowchart illustrated in FIG. 5, many other methods of performing the acts associated with FIG. 5 may be used. For example, the order of some of the blocks may be changed, certain blocks may be combined with other blocks, one or more of the blocks may be repeated, and some of the blocks described may be optional.

The method 500 may begin with receiving an identifier of a data transformation (block 502). For example, the computing device 102 may receive an identifier of a data transformation 122, 124, 126, 218, 220, 222, 224, 226 from a transformation system 128, 130. In certain implementations, the computing device 102 may receive the identifier of the data transformation 122, 124, 126, 218, 220, 222, 224, 226 from the transformation system 128, 130 after the data transformation 122, 124, 126, 218, 220, 222, 224, 226 is created. In additional or alternative implementations, the computing device 102 may receive the identifier of the data transformation 122, 124, 126, 218, 220, 222, 224, 226 in response to a user input (e.g., a user input identifying the data transformation 122, 124, 126, 218, 220, 222, 224, 226. The identifier of the data transformation 122, 124, 126, 218, 220, 222, 224, 226 may include a unique identifier of the data transformation 122, 124, 126, 218, 220, 222, 224, 226 and/or a unique identifier indicating a corresponding transformation system 128, 130 (e.g., a transformation system 128, 130 used to create the data transformation 122, 124, 126, 218, 220, 222, 224, 226 and/or a transformation system 128, 130 used to perform the data transformation 122, 124, 126, 218, 220, 222, 224, 226).

An identifier of a data type may then be received (block 504). For example, the computing device 102 may receive an identifier of a data type 118, 120. In certain implementations, the identifier of the data type 118, 120 may specify a type of data to be transformed according to the data transformation 122, 124, 126, 218, 220, 222, 224, 226 identified by the identifier received at block 502. The identifier of the data type 118, 120 may be received from a user. In certain implementations, the identifier of the data transformation 122, 124, 126, 218, 220, 222, 224, 226 and the identifier of the data types 118, 120 may be received at the same time (e.g., may be received from a user at the same time).

An association may then be stored between the data transformation and the data type (block 506). For example, the computing device 102 may store an association between the data transformation 122, 124, 126, 218, 220, 222, 224, 226 and the data type 118, 120. In certain implementations, the computing device 102 may store the association in a transportation scheme 116, 204, which may be utilized to transform data archives 104, 202, as described above.

In certain implementations, the method 500 may be repeated to create a transformation scheme 116, 204. For example, the method 500 may be repeated to add multiple associations between data types 118, 120 and data transformations 122, 124, 126, 218, 220, 222, 224, 226 to a transformation scheme 116, 204. Upon creating the transformation scheme 116, 204, the computing device 102 may store an identifier of which data archives 104, 202 are to be transformed according to the transformation scheme 116, 204. For example, the computing device 102 may store an identifier of a source or destination for data archives 104, 202 that are to be transformed according to the transformation scheme 116, 204. In such instances, data archives 104, 202 received from the identified source and/or intended for the identified destination (e.g., a storage destination and/or a runtime environment 144) may be transformed according to the transformation scheme 116, 204. In additional or alternative implementations, the transformation scheme 116, 204 used to transform a data archive 104, 202 may be identified upon receipt of a data archive 104 (e.g., based on an identifier associated with the received data archive 104, based on a preference associated with the received data archive 104, based on a file type of the data archive).

Figure 6:
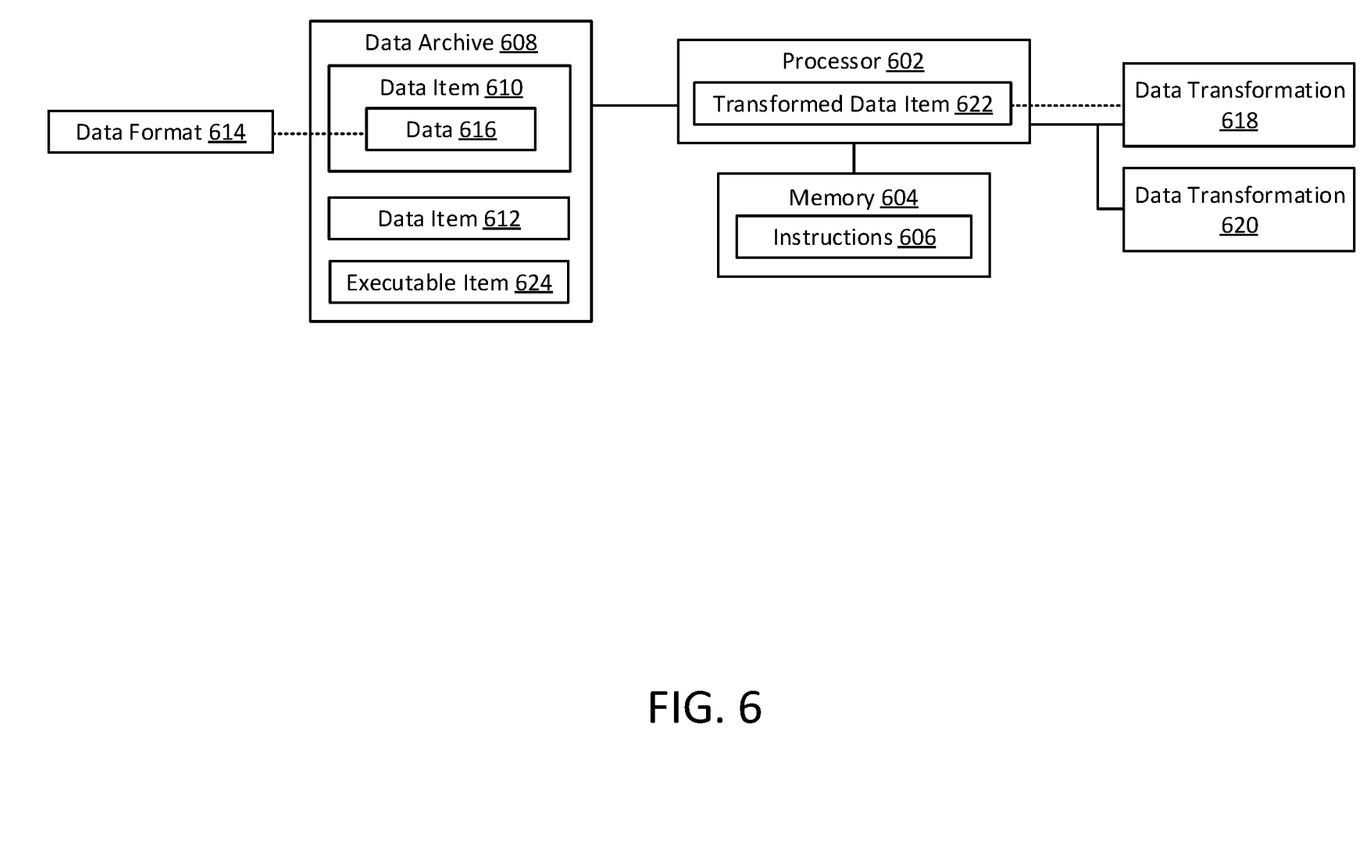
FIG. 6 illustrates a system according to an exemplary embodiment of the present disclosure.

FIG. 6 illustrates a system 600 according to an exemplary embodiment of the present disclosure. The system 600 includes a processor 602 and a memory 604. The memory may store instructions 606. When executed by the processor 602, the instructions 606 may cause the processor 602 to receive a data archive 608 containing a plurality of data items 610, 612 and select a first data item 610 of the plurality of data items 610, 612. The instructions 606 may further cause the processor 602 to identify a first data format 614 of the first data item 610. The first data format 614 may specifying a first type of data 616 stored in the first data item 610. The instructions 606 may also cause the processor 602 to select, from among a plurality of data transformations 618, 620, a first data transformation 618. The first data transformation 618 may correspond to the first data format 614. The instructions 606 may additionally cause the processor 602 to transform, by the first data transformation 618, the first type of data 616 stored in the first data item 610 to generate a first transformed data item 622 and replace the first data item 610 in the data archive 608 with the first transformed data item 622. The instructions 606 may still further cause the processor 602 to execute an executable item 624 of the plurality of data items.

All of the disclosed methods and procedures described in this disclosure can be implemented using one or more computer programs or components. These components may be provided as a series of computer instructions on any conventional computer readable medium or machine readable medium, including volatile and non-volatile memory, such as RAM, ROM, flash memory, magnetic or optical disks, optical memory, or other storage media. The instructions may be provided as software or firmware, and may be implemented in whole or in part in hardware components such as ASICs, FPGAs, DSPs, or any other similar devices. The instructions may be configured to be executed by one or more processors, which when executing the series of computer instructions, performs or facilitates the performance of all or part of the disclosed methods and procedures.

It should be understood that various changes and modifications to the examples described here will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method comprising:
   (A) receiving a packaged data archive containing a plurality of data files, wherein at least one of the data files is an executable file;
   (B) selecting a first data file of the plurality of data files;
   (C) identifying a first data format of the first data file, the first data format specifying a first type of data stored in the first data file;
   (D) selecting, from among a plurality of data transformations, a first data transformation corresponding to the first data format;
   (E) transforming, by the first data transformation, the first type of data stored in the first data file to generate a first transformed data file;
   (F) replacing the first data file in the data archive with the first transformed data file, wherein replacing includes removing the first data file from the data archive; and
   (G) executing the executable file of the plurality of data files, wherein either the executable file uses the first transformed data file while executing, or the executable file is the first transformed data file.

2. The method of claim 1, wherein (D) further comprises:
   identifying a transformation scheme associated with the data archive, the transformation scheme identifying associations between a plurality of data formats and the plurality of data transformations, the plurality of data formats including the first data format; and
   identifying the first data transformation as associated with the first data format in the transformation scheme.

3. The method of claim 2, wherein the transformation scheme is identified based on at least one of a source of the data archive or a file type of the data archive.

4. The method of claim 2, wherein the transformation scheme is specified by a preference associated with the data archive.

5. The method of claim 1, wherein (B) to (F) are repeated for at least a subset of the plurality of data files.

6. The method of claim 5, wherein repeating (B) to (F) further comprises identifying a second data file with a second data format different from the first data format and identifying a second data transformation different from the first data transformation.

7. The method of claim 6, wherein (B) to (F) are performed in parallel for the first data file and the second data file.

8. The method of claim 6, wherein the first data transformation is performed by a first transformation system and the second data transformation is performed by a second transformation system, and wherein the first data transformation and the second data transformation are performed in parallel.

9. The method of claim 1, wherein the first data transformation specifies a plurality of transformation elements for transforming the first type of data.

10. The method of claim 1, wherein (D) further comprises identifying a second data transformation corresponding to the first data format, and
wherein (E) further comprises transforming, by both of the first data transformation and the second data transformation, the first type of data stored in the first data file to generate the first transformed data file.

11. The method of claim 10, wherein the first type of data stored in the first data file is transformed by the first data transformation before being transformed by the second data transformation.

12. The method of claim 1, wherein (G) is performed by a runtime environment and wherein replacing the first data file in the data archive with the first transformed data file improves compatibility of the data archive with an execution requirement of the runtime environment.

13. A system comprising:
a processor; and
a memory storing instructions which, when executed by the processor, cause the processor to:
(A) receive a packaged data archive containing a plurality of data files, wherein at least one of the data files is an executable file;
(B) select a first data file of the plurality of data files;
(C) identify a first data format of the first data file, the first data format specifying a first type of data stored in the first data file;
(D) select, from among a plurality of data transformations, a first data transformation corresponding to the first data format;
(E) transform, by the first data transformation, the first type of data stored in the first data file to generate a first transformed data file;
(F) replace the first data file in the data archive with the first transformed data file, wherein replacing includes removing the first data file from the data archive; and
(G) execute the executable file of the plurality of data files, wherein either the executable file uses the first transformed data file while executing, or the executable file is the first transformed data file.

14. The system of claim 13, wherein the memory stores further instructions which, when executed by the processor while performing (D), cause the processor to:
identify a transformation scheme associated with the data archive, the transformation scheme identifying associations between a plurality of data formats and the plurality of data transformations, the plurality of data formats including the first data format; and
identify the first data transformation as associated with the first data format in the transformation scheme.

15. The system of claim 13, wherein the memory stores further instructions which, when executed by the processor, cause the processor to repeat (B) to (F) for at least a subset of the plurality of data files.

16. The system of claim 15, wherein the memory stores further instructions which, when executed by the processor while repeating (B) to (F), cause the processor to identify a second data file with a second data format different from the first data format and identify a second data transformation different from the first data transformation.

17. The system of claim 16, wherein the first data transformation is performed by a first transformation system and the second data transformation is performed by a second transformation system.

18. The system of claim 13, wherein the memory stores further instructions which, when executed by the processor while performing (D), cause the processor to identify a second data transformation corresponding to the first data format and wherein the memory stores further instructions which, when executed by the processor while performing (E), cause the processor to transform by both of the first data transformation and the second data transformation, the first type of data stored in the first data file to generate the first transformed data file.

19. The system of claim 18, wherein the first type of data stored in the first data file is transformed according to the first data transformation before being transformed according to the second data transformation.

20. A non-transitory, computer-readable medium storing instructions which, when executed by a processor, cause the processor to:
(A) receive a packaged data archive containing a plurality of data files, wherein at least one of the data files is an executable file;
(B) select a first data file of the plurality of data files;
(C identify a first data format of the first data file, the first data format specifying a first type of data stored in the first data file;
(D) select, from among a plurality of data transformations, a first data transformation corresponding to the first data format;
(E) transform, by the first data transformation, the first type of data stored in the first data file to generate a first transformed data file;
(F) replace the first data file in the data archive with the first transformed data file, wherein replacing includes removing the first data file from the data archive; and
(G) execute the executable file of the plurality of data files, wherein either the executable file uses the first transformed data file while executing, or the executable file is the first transformed data file.

* * * * *